May 3, 1966  M. W. FORTH  3,249,069
MATERIAL COMPRESSING MACHINE
Filed Jan. 5, 1960  4 Sheets-Sheet 1
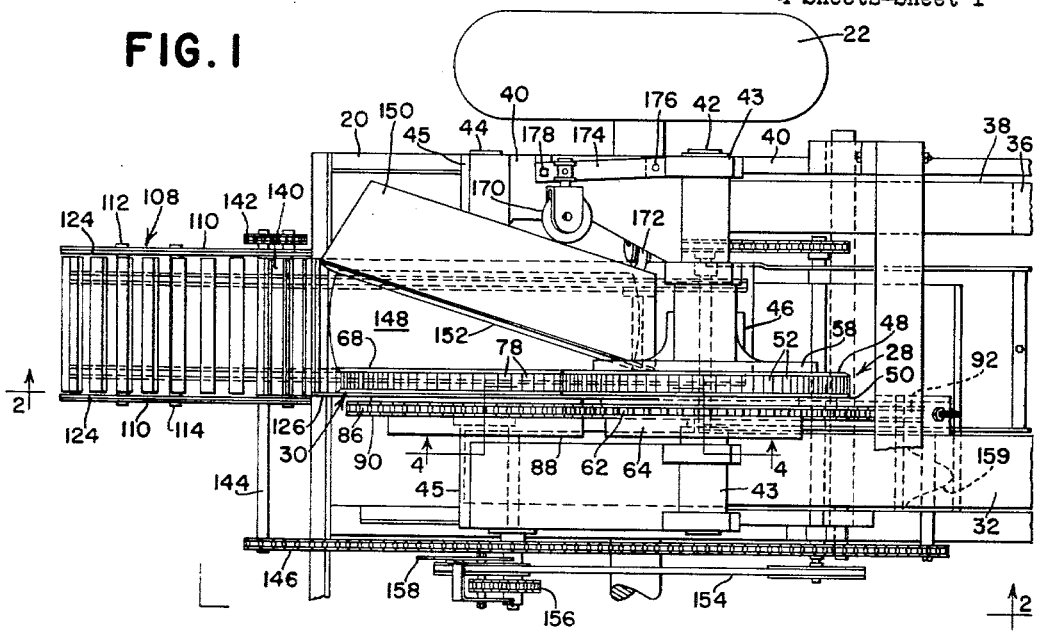
FIG. 1
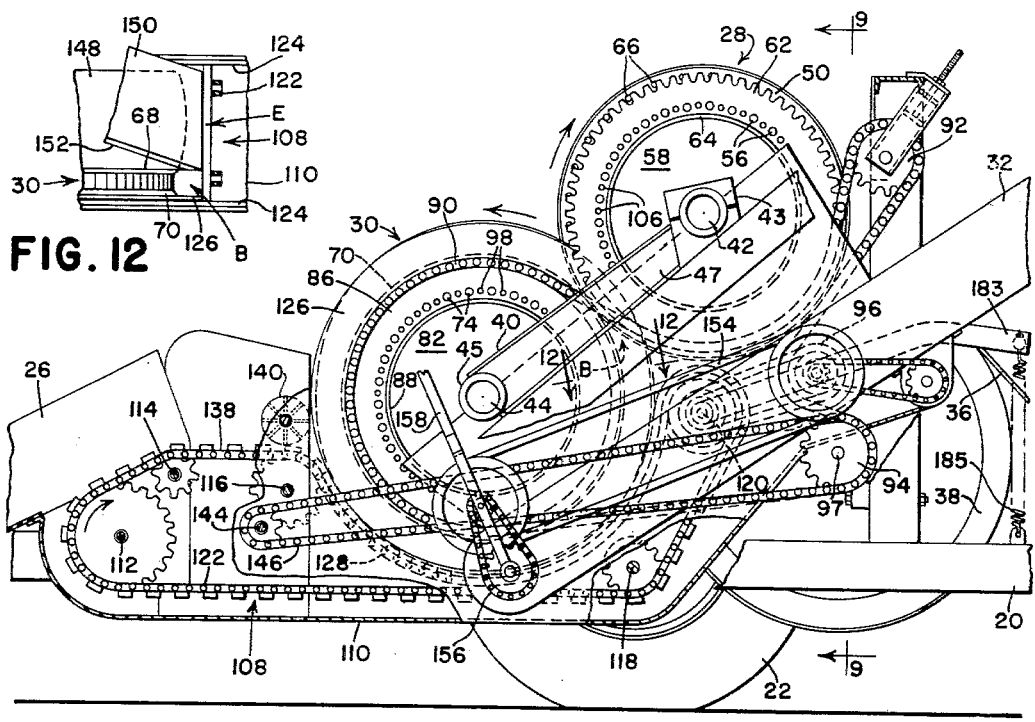
FIG. 12
FIG. 2
INVENTOR
M. W. FORTH

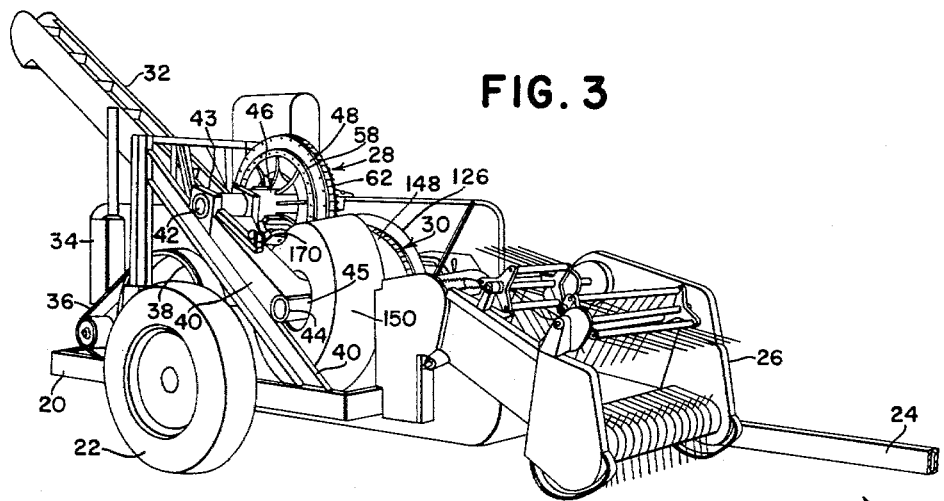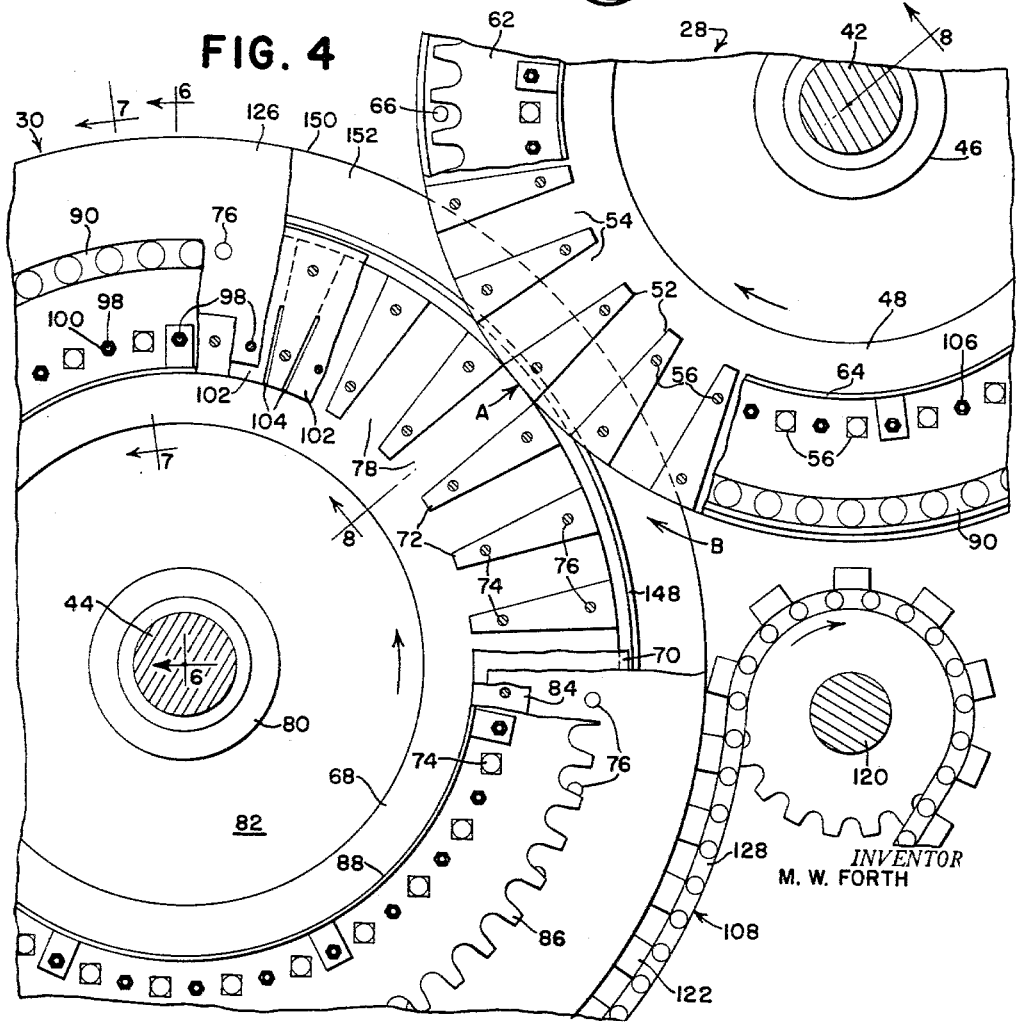

*INVENTOR*
M. W. FORTH

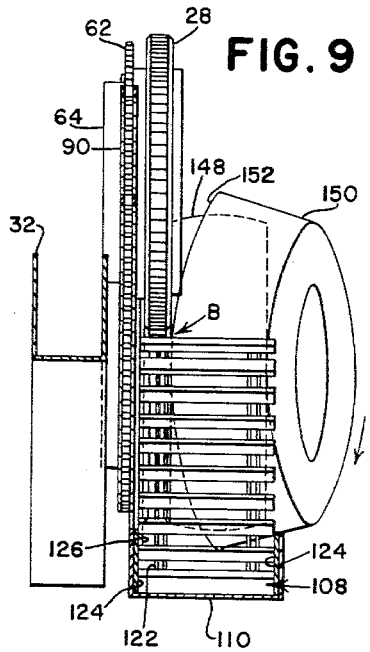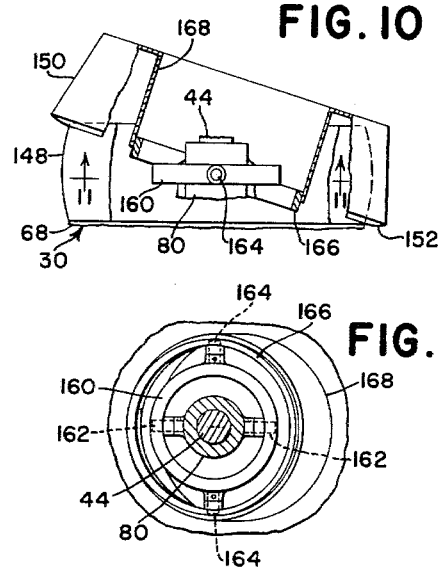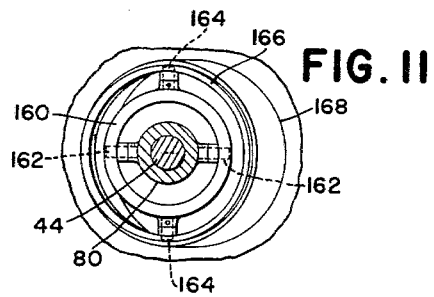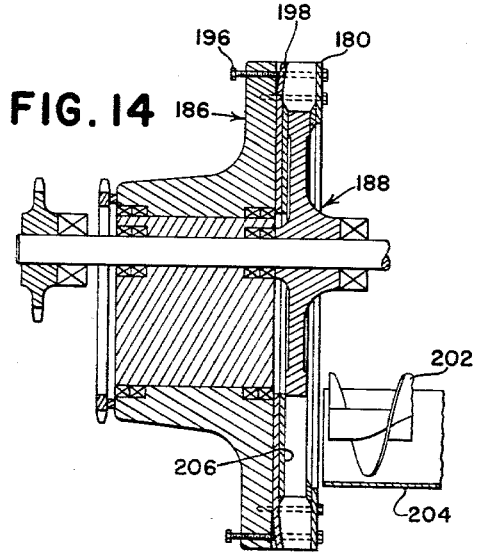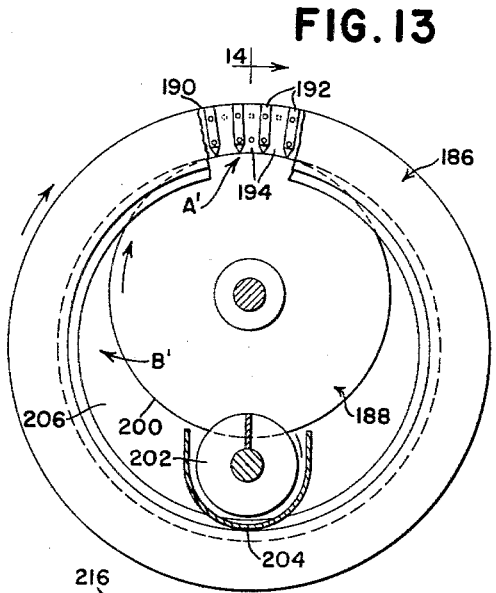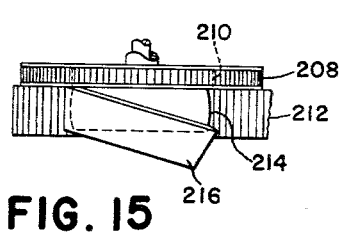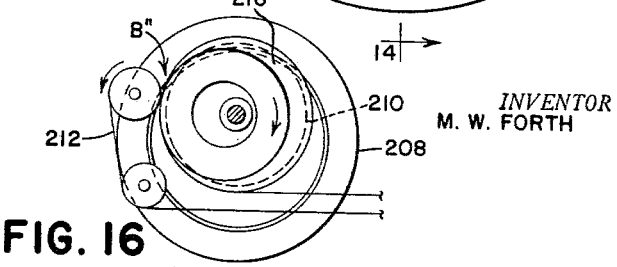

United States Patent Office 3,249,069
Patented May 3, 1966

3,249,069
MATERIAL COMPRESSING MACHINE
Murray W. Forth, Moline, Ill., assignor to Deere & Company, Moline, Ill., a corporation of Delaware
Filed Jan. 5, 1960, Ser. No. 661
5 Claims. (Cl. 107—14)

This invention relates to a material compressing machine and more particularly to a machine for compressing agricultural crops, for example, into relatively small high-density forms commonly known as wafers or pellets.

Machines for producing wafers or pellets in the form of relatively small articles for animal feed are known, but heretofore these machines have handled products of granular or pulverulent nature, as distinguished from agricultural forage products such as hay and the like, which has heretofore been customarily handled in the form of relatively large bales ranging from, say, 14 x 14 x 30 inches to 18 x 18 x 48 inches and upward and weighing in the order of from fifty to over one hundred pounds.

It is only recently that interest has been shown in the processing of forage crops in such manner as to produce a wafer or pellet compressed to an extremely high degree so that its total volume is on the order of two to fifteen cubic inches and its unit density is in the range of nineteen to sixty pounds per cubic foot. These factors will vary, of course, with the nature of the roughage and its moisture content. Present operations have been conducted with roughage having a moisture content in the area of fifteen to thirty-five percent.

It is accordingly a principal object of the present invention to provide an improved machine of the character indicated. It is a significant object to provide a machine in which the material is subjected to a considerable amount of pre-compression before it is subjected to the ultimate compression of the dies, as to which the extrusion process is preferred. An important object of the invention is to provide improved press or die wheels in which the die openings in at least one of the wheels are made adjustable so as to vary the outlet end of the opening through which the material is extruded. A further and none-the-less important object is to increase the capacity of the machine while at the same time reducing its power requirements, which is accomplished primarily by utilizing die means in which each die opening is so designed and cooperative with a registering die so as to minimize land area of the die and opening; that is, the die cooperates with the opening in such manner that the area of the opening substantially matches that of the end of the die so that the material is wholly extruded or forced into the die opening without wasting any of it between non-cooperative surfaces.

The foregoing and other important objects and desirable features inherent in and encompassed by the invention will become apparent as preferred embodiments thereof are disclosed in detail in the ensuing description and accompanying sheets of drawings, the several figures of which are described below.

FIG. 1 is a plan view, with portions broken away, of a preferred embodiment of the machine.

FIG. 2 is a side view, partly in section, as seen generally along the line 2—2 of FIG. 1.

FIG. 3 is a perspective view of the machine as seen from the front and the side opposite to that shown in FIG. 2.

FIG. 4 is an enlarged fragmentary section taken generally on the line 4—4 of FIG. 1.

FIG. 9 is a section as seen along the line 9—9 of FIG. 2.

FIG. 10 is a section as seen along the line 10—10 of FIG. 5.

FIG. 11 is a section as seen along the line 11—11 of FIG. 10.

FIG. 12 is a fragmentary view, on an enlarged scale, as seen along the line 12—12 of FIG. 2.

FIG. 13 is a fragmentary elevation, with portions broken away and portions shown in section, of a modified form of press wheel arrangement.

FIG. 14 is a section on the line 14—14 of FIG. 13.

FIG. 15 is a plan view of a further modified form of press wheel and feeder arrangement.

FIG. 16 is a schematic elevation of the structure shown in FIG. 15.

Figure 5:
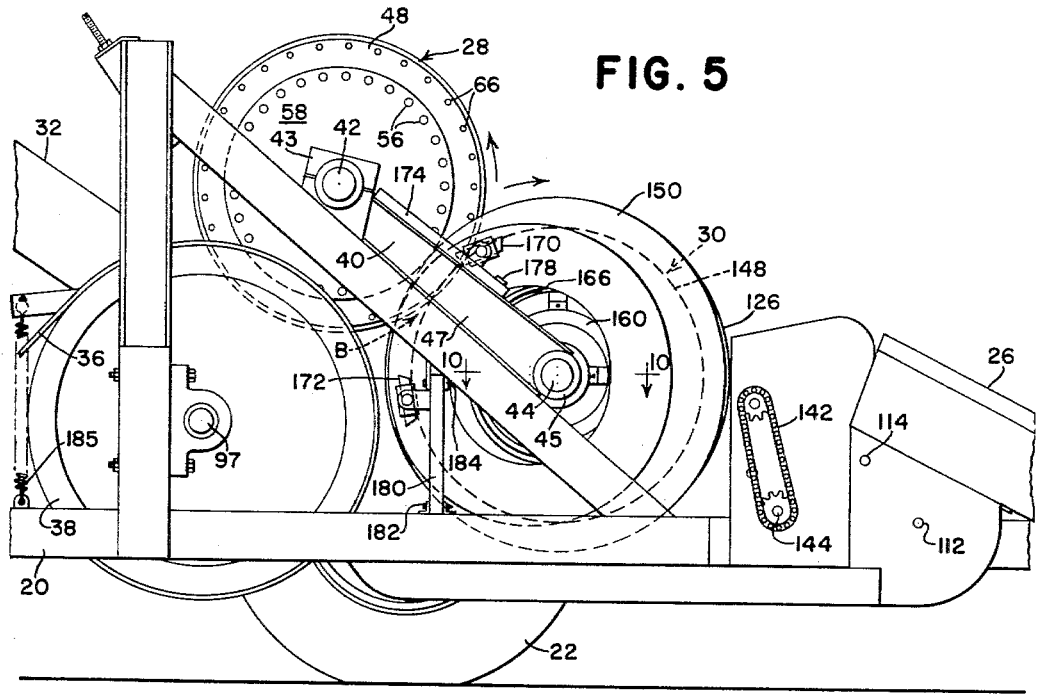
FIG. 5 is a side elevation, with portions removed, as seen from the same side of the machine as shown in FIG. 3.

The nature of the machine may be best comprehended by regarding it in its entirety, having reference particularly to FIG. 3 wherein it is shown that the machine comprises essentially a main supporting frame 20 carried by wheels 22 and provided with a forwardly extending draft tongue 24 for connection to a tractor or similar draft vehicle. The present embodiment of the machine is designed for operation in a field of previously harvested crops and to this end is provided at a forward portion thereof, to the right of the draft tongue 24, with pick-up means 26 of the type commonly employed in agricultural balers, for example. The type of pick-up means, or whether or not the machine operates in a field, are not material limitations on the invention and the description is based largely upon a machine with which successful results have been obtained. As the machine is drawn over the field, the pick-up means 26 picks up the harvested crop from the ground and causes it to move rearwardly to feed means (to be described later) which in turn feeds the material to a pair of cooperative press wheels 28 and 30. These wheels, as will appear below, have cooperative die means which compress and extrude the material into pellet or wafer form as described above, and these pellets or wafers are discharged laterally into an elevator 32 which inclines upwardly and rearwardly for delivering the pellets or wafers to a trailing vehicle (not shown). The main frame 20 is shown as carrying an internal combustion engine 34, the output of which is belted at 36 to a flywheel 38 which is in turn operatively connected to the several moving parts of the machine.

The rear or upper die or press wheel 28 is suitably journaled on a cross shaft 42 which is in turn carried by clamping blocks 43 that form part of a heavy subframe 40. The lower or forward press wheel 30 is carried by a similar cross shaft 44, similarly mounted in the subframe by sleeves 45 welded or otherwise rigid with the subframe. This subframe, made up of its side members 47 and the two shafts, functions as a rigid unitary support for the die wheels and maintains the parallelism of the shafts even though the main frame flexes and twists. Hence, the subframe may be very simply mounted on the main frame in any suitable manner.

Figure 6:
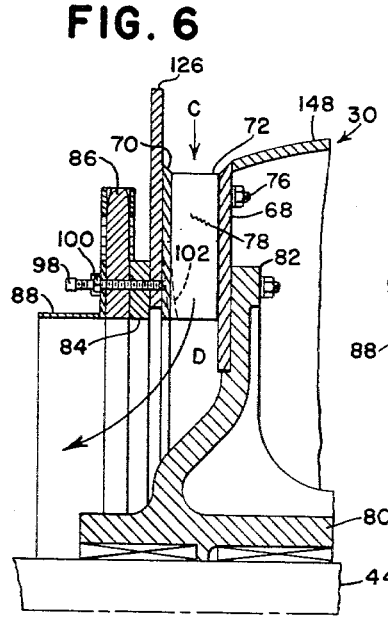
FIG. 6 is a fragmentary section on the line 6—6 of FIG. 4.

The wheel 28 is made up of a hub 46 which carries a concentric annulus having opposite axially spaced apart radial sides in the form of inner and outer plate-like rings 48 and 50 (FIG. 8) which, together with a plurality of uniformly circumferentially spaced spacer means or die blocks 52, provide die means including a similar plurality of die cells or openings 54 (FIG. 4). Each opening 54 is disposed on a radius of the wheel and has opposite ends, opening respectively to the inner and outer peripheries of the annulus made up by the rings 48 and 50, the blocks 52 and the openings 54. In the present embodiment, the inlet ends of the die openings are at the peripheral surface of the annulus and the outer end faces of the die blocks are generally flush with this surface. The two rings and the die blocks are rigidly secured together by means including a first circle of bolts 56, and these bolts serve additionally to mount the annulus on an integral circular web 58 of the hub 46. A ring-like spacer 60 is coaxial at the opposite side of the wheel along with a sprocket 62 and a concentric discharge ring 64, all mounted by the bolts 56, together with other bolts to be described below. The ring 64 is at the same side of the machine as the conveyor 32 which, as best seen in FIGS. 1 and 2, extends downwardly and alongside both press wheels 28 and 30. As will be brought out below, the material compressed and extruded through the die openings 54 travels radially inwardly toward the hub 46 and, since the web 58 extends radially between the bolt circle 56 and the hub, it forms in effect a disk that closes the wheel to the right of the annulus of die openings so that the radially inwardly extruded material must exit from the wheel in a laterally outward direction or to the left hand side of the machine, which is to the left as seen in FIGS 6 and 9 or toward the observer as seen in FIG. 2 (see arrow D in FIG. 6). Here, as elsewhere in the description, the expressions "right" and "left" are used with reference to the position of a person standing behind the machine and facing forwardly, the direction of travel of the machine being apparent from FIG. 3, since the draft tongue 24 is at the front. The discharged wafers or pellets are thus caused to drop into the conveyor 32 for upward and rearward discharge as described generally above.

In addition to the circle of bolts at 56, the die blocks 52 and plates 48 and 50 are rigidly cross connected by a second circle of cap screws 66.

The discharging relationship between the wheels 28 and 30 and conveyor 32 may also be seen in FIG. 9.

Figure 7:
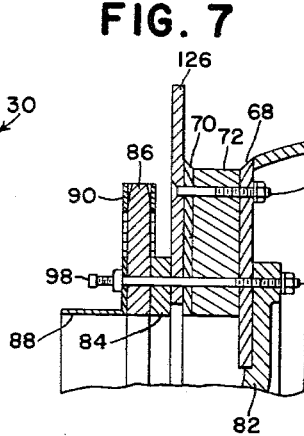
FIG. 7 is a fragmentary section on the line 7—7 of FIG. 4.

The construction of the wheel 30 is substantially identical to that of the wheel 28, with a few additions to be described below. The wheel 30, like the wheel 28, comprises inner and outer rings 68 and 70, spaced apart by a plurality of uniformly circumferentially spaced die blocks 72 and rigidly cross connected by a circle of bolts 74 and an additional circle of bolts 76. The die blocks 72 are identical to the die blocks 52 in the wheel 28 and consequently the wheel 30, has, in its annulus established by the rings 68 and 70 and die blocks 72, a plurality of die openings 78 identical to the die openings 54. The wheel 30 includes a hub 80 which is journaled on the previously described shaft 44 and which has an integral radial web 82 on which the annulus is mounted by means of the inner circle of bolts 74 (FIGS. 6 and 7).

The circle of bolts 74 additionally mounts, at the opposite side of the wheel, a spacer ring 84, a sprocket 86 and a discharge ring 88, this ring, like the ring 64 for the wheel 28, being at the side of the wheel facing and discharging into the conveyor 32.

Figure 8:
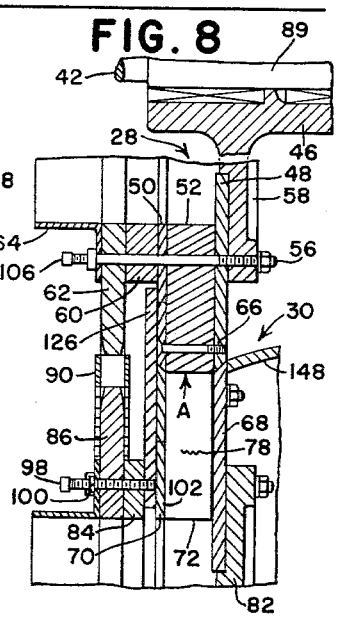
FIG. 8 is a fragmentary section as would be seen along the line 8—8 of FIG. 4 if FIG. 4 were in elevation.

The two wheels are arranged so that the peripheral surfaces of their rims or annuli lie tangent to each other, the axes of the shafts 42 and 44 being of course parallel. The shaft 42, as best seen in FIG. 8, has a central portion 89 on which the wheel 28 is journaled and this portion, although of course cylindrical, is eccentric to the remainder of the shaft. The purpose here is to enable the shaft to be rotated, after the clamping blocks 43 are loosened, whereby the contact of the wheels at the point of tangency may be varied. The wheels are driven in the directions of the arrows indicated, by means including a drive chain 90, which is wrapped about the sprockets as best seen in FIG. 2, being additionally carried by upper, lower and intermediate sprockets 92, 94 and 96 respectively. The sprocket 94 is keyed to a shaft 97 to which the flywheel 38 is also fixed, as best shown in FIG. 2.

Because of the nature of the arrangement of the wheels 28 and 30, and the tangency of their rims, best indicated for reference purposes by the letter A in FIG. 4, there is afforded just circumferentially ahead of the point A what may be regarded as a bite B into which the material to be compressed and wafered or pelleted is directed. This part of the operation will be described below. It is a feature of the invention that the inlet and outlet ends of each of the die openings 54 and 78 are square, which is further related to dimensional characteristics of such nature as to improve the operating efficiency of the machine as well as to materially lower the power requirements. As best seen in FIGS. 4, 6, 7 and 8, each die opening extends completely axially across between its two rings. That is to say, in the case of the die opening 54, it extends fully between its two rings 48 and 50, and additionally the outer peripheral edges of the rings are tapered or beveled. This taper cooperates with a reversely beveled edge on each of the rings 68 and 70 of the other wheel, where again the axial dimension or lateral width of each opening 78 is completely across the two rings 68 and 70. These dimensional characteristics mean that there is very little ineffective area laterally of the annuli or rims of the wheels, and this, in conjunction with the fact that the inlet end of each die opening is substantially identical to the proximate end of the cooperating die, means that the inlet opening and die are almost perfectly effective in handling the material. In other words, there is a very little land area in the zone of registration of the end faces of the blocks and the cooperative openings as they register at the point A during rotation of the wheels, and, since the end faces of the blocks of each wheel are generally flush with the peripheral surface of the respective annulus, they do not enter the openings of the other wheel. As a practical matter, the end of the die proximate to its mating opening is slightly larger, at least in a circumferential direction, than the inlet end of the opening. The purpose here is two-fold: the difference in dimension enables the block to shear material at the edges of the opening, and tolerance or latitude is provided to aid in timing the wheels for register of blocks and openings. As will be seen in FIG. 4, each die block tapers inwardly toward the center of its wheel so that the openings 54 or 78 are substantially of uniform cross sectional area throughout.

However, an important addition in this respect is the adjustability of the outlet ends of the openings. FIG. 6 best illustrates this feature, wherein it is shown that the wheel carries a circle of adjusting screws 98, each equipped with a lock nut 100 and each extending inwardly to that portion of the ring 70 between neighboring die blocks 72. A representative portion of the ring 70 as just indicated is represented by the numeral 102 in FIG. 4, which portion is provided by a pair of slits 104 in the ring so that the portion 102 is bendable inwardly. Hence, when the screws 98 are tightened, the portions 102 are deflected inwardly as shown in dotted lines in FIG. 6. This will reduce the cross sectional area of the outlet end of the opening 78, it being clear that the material is forced into the opening in the direction of the arrow C and exits in the direction of the arrow D. The same type of arrangement is provided in the wheel 28 and the adjusting screws are visible at 106.

As already indicated herein, it is known to provide mating or "meshing" wheels and to feed material into the bite formed thereby for the purpose of extruding the material through die openings by die blocks. However, as also just described, prior structures are deficient in the design of die blocks and die openings, a deficiency which is overcome by the novel dimensional and related characteristics set forth above. These features are even more important when it is considered that the material handled by a machine based on the present design is characterized by stringiness and relatively high moisture content as distinguished from dry, pulverulent or granular material.

The present design features a further important aspect involving the feeding of the material to the bite B, and this means here takes the form of a feeder means or conveyor, indicated in its entirety by the numeral 108, for feeding material from the rear of the pick-up means 26 to the bite.

The feeder means includes a trough 110 which extends rearwardly from the rear of the pick-up means 26 and underlies the wheels 28 and 30, or at least that portion thereof embracing the area of the bite B. Suitable framework on the machine, including opposite sides of the trough 110 carry a plurality of parallel cross shafts 112, 114, 116, 118 and 120 which in turn carry sprockets for mounting an endless conveyor chain 122 of the cross-slatted type. The upright walls of the trough 110 are provided with suitable wear strips 124 which hold the slats of the conveyor from shifting laterally in undesirable amounts.

As best seen in FIGS. 1, 9 and 12, the rims of the wheels 28 and 30 are relatively narrow and the width of the conveyor 108 is considerably greater. This means that the conveyor will handle quite a volume of relatively loose material and further indicates that this material must be delivered to the bite in such fashion that the press wheels are capable of forming wafers or pellets of desirable characteristics as outlined above. It is a feature of the present invention to preliminarily compress the material so that the entire job of compression is not left to the die wheels. This cuts down the power requirements of the machine, as will be readily apparent.

To accomplish this result, the conveyor chain is made to follow a portion of the front press wheel 30, which is accomplished by the provision on this press wheel of backing means in the form of a radial flange or ring 126 which is interposed between the sprocket 86 and the proximate ring 70 and which has a diameter considerably greater than that of the rings 68 and 70. Consequently, the ring 126 will overlap the area of the bite B at one side thereof, which here is the side closer to the conveyor 32. Also, because of the increased diameter of the ring 126, it, along with additional means to be described, serves as a guide for the chain of the conveyor 108, the slats of the conveyor bearing against the edge of the ring from below so that the conveyor in this area has an arcuate run 128 leading upwardly to and looped about the sprockets on the rearwardmost and uppermost shaft 120. The lower run of the conveyor returns in the bottom of the trough 110 and any material not received in the bite B is carried over and returned to the forward portion of the conveyor, which forward portion, especially that extending between the sprockets on the shafts 114 and 116 may be regarded as an inlet to or an extension of the arcuate run 128, designated here at 138 for convenience. Also, in this area, the feeder means includes an upper feed roll 140 which cooperates with the conveyor portion 138. As shown in FIG. 5, the feed roll may be driven by a chain 142 from any appropriate source, such as from a cross shaft 144 which is driven at its opposite side by a chain 146 from a sprocket on the shaft that carries the previously described main chain drive sprocket 94. The drive may of course be different from that described and such differences are immaterial. The present description is based on a preferred embodiment of the machine.

The conveyor 108 travels in the direction indicated by the arrow on the sprocket on the shaft 112 as shown in FIG. 2, thus conveying material rearwardly and beneath the front press wheel 30 to the bite B wherein it is received and compressed and extruded through successive die openings as the die openings in one wheel register successively with die blocks in the other wheel. During the feeding of the material, it is necessary that the material be confined to the conveyor and further that it be compressed both radially as respects the axis of the shaft 44 and also axially as respects that shaft. Part of the pre-compressing means, which is also related to and which therefore may be regarded as part of the feeding means, is a coaxial extension or feeder drum 148 rigid on the wheel 30 at the side thereof opposite to the sprocket 86. In other words, the drum 148, being rigidly secured to the wheel 30, rotates with the wheel and its maximum diameter is generally on the order of but slightly larger than that of the proximate annulus ring 68, because the drum is a section of a sphere, and the outer peripheral surface thereof is spaced slightly above the tops of the slats of the conveyor 108 as these slats pass rearwardly beneath the drum. Thus, material on the conveyor is compressed between the drum and the slats, which represents what may be regarded as radial pre-compression. It is a further feature of the invention that the material is also axially pre-compressed, the means for doing which will be described immediately below.

FIG. 12 shows generally the relationship of the bite as closed at one side by the backing ring or shield 126, and illustrates further the relative widths of the press wheel 30 and the conveyor 108. Hence, it remains to axially compress the material into the bite B so that it enters the bite in a volume substantially as wide as the lateral width of the bite B. This, in combination with the ultimate compression of the pre-compressed material by the wheels, contributes materally to the production of desirable wafers or pellets. Now, refarding the arcuate run 128 of the conveyor as a first movable element for feeding material toward the bite, a second movable element exists in the form of a drum 150 having an outer surface in the form of a section of a cone. This drum is rotatable on an axis which is angled to the axis of the shaft 44 and which intersects that axis as best shown in FIG. 10. Thus, the conical section of the drum 150 provides that the outer surface of the drum will, in the area shown at E in FIG. 12, ride on the slats of the conveyor. Moreover, the drum 150 includes, at its peripheral edge facing the wheel 30, a radial flange 152 which lies generally in a plane that converges toward the bite B relative to the plane of the backing ring 126. The drum 150 is hollow and loosely surrounds the drum 148 and the converging relationship is such that the forward portion thereof, relative to the backing ring 126, is spaced from the ring substantially the width of the conveyor 108. Hence, the material is not only compressed vertically or radially between the drum 148 and the conveyor but is also compressed axially between the flange 152 of the drum 150 and the backing ring 126 so that the material is led into the bite as a pre-condensed stream. Since the backing ring 126 overlaps the bite in the critical area, the material cannot escape but must be fed into the bite to be received by the cooperating die blocks and die openings. As previously described, any material that escapes this area is carried over by the conveyor and is returned by the lower run and ultimately returns to the front of the receiving area as represented by the forward portion of the press wheel 30, press wheel drum 148, feed roll 140 and inlet portion 138 of the conveyor. Also, as already indicated, material extruded radially inwardly through the die openings drops laterally to the elevator 32, being guided to the elevator by the respective discharge rings 64 and 88 on the press wheels. The elevator 32 may be driven in any suitable manner, as by a belt 154 driven from a sheave on the shaft that carries the upper idler sprocket 96 for the press wheel chain 90, plus an auxiliary chain 156 suitably associated with a lever 158 which establishes a clutch relationship for engaging and disengaging the drive to the conveyor. Here again, the drive details are relatively immaterial. A transverse auger 159 operates beneath the slatted floor of elevator 32 for returning to the conveyor 108 any fragments of material that are not in pellet or wafer form. Thus, this material is returned by the lower run of the conveyor to the upper inlet portion 138 so that no material ultimately escapes the processing of the machine.

The mounting of the conical-section drum 150 for rotation with the spherical-section drum 148 and wheel 30 so that all rotate in unison but about different axes is best illustrated in FIGS. 10 and 11, wherein it is shown that the hub 80 of the wheel 30 carries thereon a spider 160 which is connected to the hub by a pair of diametrically opposed pintles 162. Consequently, the spider rotates with the hub 80 but is free to rock relative thereto about the common axis of the pintles. The spider has a second pair of pintles 164 which lie on a common diameter 90° from the axis on which the pintles 162 lie. These pintles carry a ring 166 which is rigid with a collar or sleeve 168 which is in turn rigid with the conical-section drum 150. The drum 150 is therefore free to rock relative to the drum 148 about the axis of the pintles 164; although, of course, the two drums will rotate in unison, the drive connection establishing a universal joint. The surface of the drum 148 is spherical about the center of this joint.

The angle of the drum 150 to the drum 148 may be maintained in any number of suitable ways, such as by a pair of rollers 170 and 172 (FIGS. 1 and 5) which bear against the outer surface of the drum 150 and hold the drum in the position shown. The upper roller 170 is mounted on an arm 174 which is pivoted at 176 to part of the main frame and the position of which is maintained by a shear pin 178. The roller 172 is carried by an arm 180 which is pivoted to the frame 20 at 182 and is normally held in place by a shear pin 184. In the event of extreme lateral pressures, the shear pins may break so that the arms 174 and 180 may swing, allowing the drum 150 to swing away from the backing ring 126.

Another characteristic of the relationship between the conveyor 108 and the conical-section drum 150 is best shown in FIG. 9, wherein it will be seen that the slats of the conveyor ride on the peripheral edge of largest diameter of the drum 150, and, in the area substantially coincident with the arcuate run 128 of the conveyor chain 122, the edge just referred to plus the edge of the backing ring 126 serve to guide the arcuate run so that it conforms to the critical zone, it being understood, of course, that the chain is slightly flexible and perfect support is not required except in the areas of greatest pressures, which will be found to be carried out as the edge of the drum 150 converges toward the bite B.

The shaft 120, which carries spaced sprockets to support the rear upper end of the conveyor 108, is mounted at the forward end of a frame 183 which is rockable about the shaft that carries the sprocket 96 for the chain 90. This frame is spring-loaded at 185 so as to keep the arcuate run of the conveyor in conforming relation to the wheel 30 in the area leading to and including the bite B. When material is radially compressed between this conveyor run and the surface of the drum 148, it remains under radial pre-compression and is of course subsequently pre-compressed axially. That is, radial pre-compression is not lost during axial pre-compression but both phases of pre-compression are maintained as the material is forced into the bite to be further compressed and then extruded by the die wheels. Should a foreign, incompressible object be received between the conveyor and drum 148, the spring 185 will yield. As already described, the shear pins in the mountings for the rollers will break to relieve the situation when such foreign object interferes with axial pre-compression.

In the modified form of press wheel arrangement shown in FIGS. 13 and 14, there are a large press wheel 186 and a smaller press wheel 188. In this case, the wheel 186 has an annulus 190 constructed in a pattern generally following that of the previously described press wheels, and to this end has a plurality of uniformly circumferentially spaced die blocks 192 which provide a similar plurality of circumferentially spaced die openings 194.

As best shown in FIG. 14, the adjusting principles previously described are utilized here, a set screw, for example, being provided at 196 for the purpose of displacing a bendable portion 198 of the proximate part of one of the rings making up the annulus 180. One difference is, of course, that the material is extruded radially outwardly rather than inwardly. Another difference is that the rim of the wheel 188, as at 200, is or may be smooth rather than being provided with openings. In other words, the material is extruded radially outwardly through the openings 194 in the annulus 190. Also, the dimensional characteristics outlined above are followed here so as to make the wheel as efficient as possible. The peripheries of the wheels are tangent at the point A' and these peripheries afford a material-receiving bite B' to which material is fed by feed means, such as an auger 202 cooperative with a trough 204 and delivering to the wheels at a point circumferentially ahead of the bite B', having regard to the directions of rotation of the wheels as indicated by appropriate arrows in FIG. 13. The auger 202 and its trough 204 provide cooperative elements which serve to compress the material axially before it is introduced into the bite B, it being noted that the wheel 186 has therein a radial face 206 which affords a backing means against which the incoming material is fed. The wheels are appropriately mounted on shafts and bearings which will be obvious from FIG. 14 without further description.

In that form of the invention shown in FIGS. 15 and 16, press wheels of the character shown in FIGS. 13 and 14 are utilized, being designated here by the numerals 208 and 210 for ready reference, and utilizing a conveyor 212, a drum 214 and a second drum 216. The drum 214 is like the drum 148 in FIGS. 1–12 and is mounted on and rotatable with the smaller press wheel 210. The drum 216 is like the drum 150 of FIGS. 1–12 and cooperates with the drum 214 and with the drum 212 in the manner previously described to force material inwardly in axial compression to a bite indicated generally at B'', the arcuate run of the conveyor, as illustrated schematically, being maintained by the largest-diameter edge of the drum 216. The principle of radial outward extrusion as in FIGS. 13 and 14 is utilized in the structure of FIGS. 15 and 16. As will be obvious, these mechanisms may readily be added to a complete machine such as that illustrated in FIGS. 1, 2, 3 and 5, following details or variations thereof as the need may be.

In all forms of the invention, and particularly those involving the basic principles of pre-compression and ultimate formation of the wafers or pellets, novel design has been followed to the end that the machine, bearing in mind the relatively complicated nature of its structure and operation, may be made simply and relatively inexpensively. Features and advantages other than those outlined will readily occur to those versed in the art, as will many modifications and alterations in the preferred embodiments disclosed, all of which may be achieved without departure from the spirit and scope of the invention.

What is claimed is:

1. A press wheel for a machine of the class described, comprising: a hub; a multi-part annulus concentric with and carried by the hub, including first and second rings concentric with and carried by the hub in closely axially spaced apart relation and a plurality of uniformly circumferentially spaced separate generally radial die blocks secured between and axially spacing the rings and providing a similar plurality of generally radial die openings, each opening having radially opposite ends for the receipt of material at one end and the extrusion of such material at its other end; at least one of said rings in each portion thereof between a pair of neighboring die blocks and adjacent one end of the associated opening being adjustable crosswise of said end of the opening so as to vary the area of the opening at said end; and means carried by said annulus for adjusting said portions.

2. The invention defined in claim 1, in which: said one ring is a one-piece element provided with a plurality of radial slits therein so as to establish said portions as bendable for said adjustment.

3. A press wheel for a machine of the class described, comprising: a hub; a multi-part annulus concentric with and carried by the hub, including first and second rings concentric with and carried by the hub in closely axially spaced apart relation and a plurality of uniformly circumferentially spaced separate generally radial die blocks secured between and axially spacing the rings and providing a similar plurality of generally radial die openings, each opening having radially oposite ends for the receipt of material at one end and the extrusion of such material at its other end; at least one of said rings in each portion thereof between a pair of neighboring die blocks and adjacent one end of the associated opening being adjustable crosswise of said end of the opening so as to vary the area of the opening at said end; annular backing means carried by the annulus in closely axially spaced relation to said portions; and a plurality of force-exerting devices carried by the backing means and respectively engaging and for adjusting said portions.

4. The invention defined in claim 3, in which: said one ring is a one-piece element provided with a plurality of radial slits so as to establish said portions as bendable for said adjustment.

5. A press wheel for a machine of the class described, comprising: a hub; a multi-piece annulus carried by and concentric with the hub and having opposite, axially spaced radial sides and inner and outer peripheries and further having a plurality of uniformly circumferentially spaced spacers secured between and interconnecting the sides and providing a like plurality of openings extending generally radially so that each opening leads at opposite ends thereof respectively toward said inner and outer peripheries, each opening having related walls comprising axially opposed portions of the sides and circumferentially opposed radial portions of the associated neighboring pair of spacers; at least one of said walls for each opening being adjustable crosswise of its opening at one end thereof so as to vary the area of the opening at said end; and means for adjusting said adjustable walls.

References Cited by the Examiner

UNITED STATES PATENTS

| | | | |
|---|---|---|---|
| 516,023 | 3/1894 | Rice | 25—76 |
| 729,149 | 5/1903 | Fenn | 25—12 |
| 1,127,925 | 2/1915 | Schueler | 107—8.35 |
| 1,803,344 | 5/1931 | Noxon | 107—8.35 |
| 2,052,449 | 8/1936 | Connell | 107—8.35 |
| 2,646,594 | 7/1953 | Field | 18—12 |
| 2,675,768 | 4/1954 | Helm | 107—8.35 |
| 2,958,900 | 11/1960 | Meakin | 107—14 |

FOREIGN PATENTS

| | | |
|---|---|---|
| 566,820 | 12/1932 | Germany. |
| 374,856 | 6/1932 | Great Britain. |

CHARLES A. WILLMUTH, *Primary Examiner.*

ABRAHAM G. STONE, JOSEPH D. STEERS, WALTER A. SCHEEL, *Examiners.*

BILLY J. WILHITE, CARL J. FRIBERG, JOSEPH SHEA, *Assistant Examiners.*